Inventors:

HAYDN VICTOR PURDY
RONALD CAMPBELL McINTOSH

Inventors:
HAYDN VICTOR PURDY
RONALD CAMPBELL McINTOSH

By
Attorneys

FIG. 8

— · — · —  FIRST SCAN LINE
≡≡≡≡  SUBSEQUENT SCAN LINES

FIG. 9

United States Patent Office 3,508,245
Patented Apr. 21, 1970

3,508,245
PHOTOGRAPHIC REPRODUCTION
Haydn Victor Purdy, Fontenoy Road, London. SW. 12, England, and Ronald Campbell McIntosh, Skimpans, Welham Green, Hertfordshire, England
Filed Nov. 12, 1965, Ser. No. 507,507
Claims priority, application Great Britain, Nov. 13, 1964, 46,388/64
Int. Cl. G08b 23/00; H04n 5/84
U.S. Cl. 340—324    14 Claims

ABSTRACT OF THE DISCLOSURE

Photographic reproduction equipment includes a matrix of rectangular subjects, including a space subject. A scanning cathode ray tube scans the rectangular subjects in raster fashion and a print-out cathode ray tube is used as a photographic source of light to expose a photo-sensitive sheet. A carriage moves along a path parallel to the axis of the print-out tube. The photo-sensitive sheet is held by a support in a fixed printing position parallel to and spaced from the path of movement of the carriage. There is an optical system on the carriage which directs the beam from the print-out tube through a right angle to the photo-sensitive sheet. An electro-optical grating system has a portion mounted on the carriage and a portion adjacent the carriage and generates electrical pulses during the movement of the carriage. A program means controls the scanning cathode ray tube to scan the subjects of said matrix. A raster control means controls the scanning tube in accordance with the electrical pulses generated by the electro-optical grating system. A print-out control means applies successive trace signals generated by the scanning tube, which trace signals are generated on the print-out tube under control of the pulses generated by the grating system so that a succession of traces generated by the print-out tube and corresponding to a number of scan subjects are applied, by the portion of the optical system adjacent the carriage, in parallel relation along a linear printing position of a stationary photosensitive sheet on said support. Means are provided for moving successive spaced line positions on a sheet on the sheet support to said printing position.

---

This invention relates to electro-optical printing systems and equipment.

The object of the invention is to provide relatively simple and economical equipment which has a high order of accuracy despite lack of sophistication.

An important aspect of the invention relates to an electro-optical record scanning and reproducing system in which a record is raster scanned by a flying spot, and the raster line signals so produced are applied raster line by raster line to photographic film.

Another important aspect of the invention consists in generating an electrical scanning pulse train from an associated mechanical scanning movement, or self colcking arrangements for such systems. Photo-electric equipment controlled by optical gratings is preferably used.

The invention will be described with reference to an embodiment shown in the accompanying drawings which illustrate a system for selecting a series of printing characters individually one at a time from a pictorial record of such characters, scanning each successive picture vertically line by line and controlling the application of a corresponding modulated light beam onto a photographic film to create a printed page.

In the drawings:

FIG. 7 shows carriage control equipment, while

Basically, the selection and projection system consists in directing a light beam from an index tube through a lens system onto one of a number of printing characters printed on a transparency, the modulated beam emerging therefrom being directed by a lens system to a photo-multiplier while the character is raster scanned by the index tube, and the resulting electrical pulse trains used for controlling the printing of the selected character raster-wise on photographic film.

By using a type-setting coded tape which has been recorded from an operator's keyboard to control the sequence of characters and their layout, a photographic page printing transparency can be produced. Theoretically a single scanning beam could be directed via a suitable lens system onto any one of, for example, 64 characters, arranged in coordinate array on a single transparency. However, problems of beam distortion, design of index tube, and the like renders it desirable to multiplicate parts of the system.

It is, however, more practicable to divide the master transparency in several parts, for example, four transparencies carrying 16 characters each, with each trans parency having its own scanning tube and light beam projecting lens system.

Again, an index scanning tube can be arranged to scan, for example, any one of a number coordinately arranged rasters on its screen and corresponding groups of characters can be allocated to the individual raster areas on the tube screen.

Figure 1:
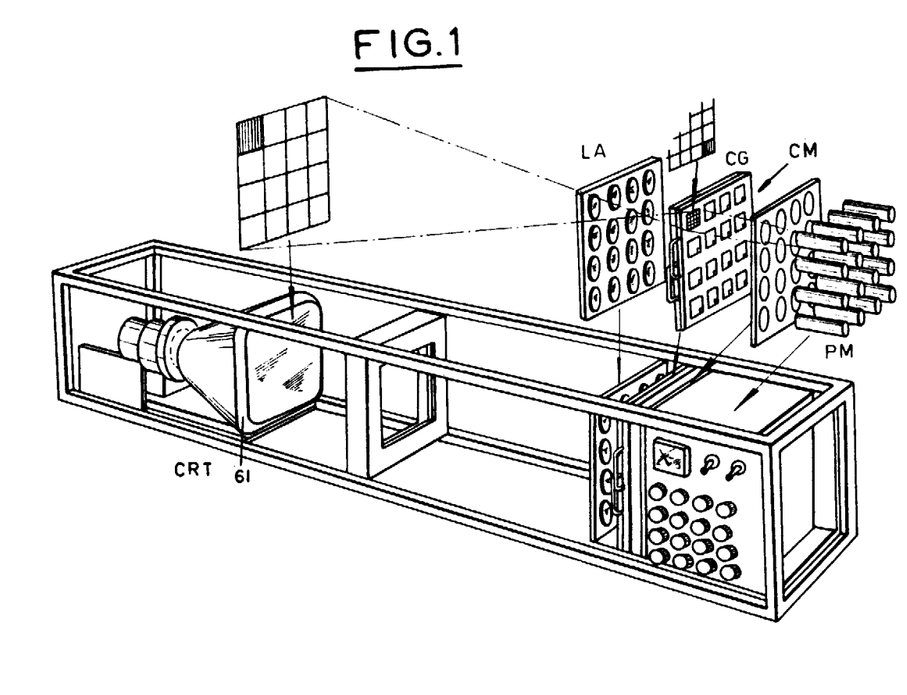
FIG. 1 shows the equipment for selectively scanning printing characters one at a time by an index CRT tube, which scans each character and produces a corresponding modulated signal train.

The arrangement presently preferred is shown in FIG. 1, in which a character matrix, generally CM, carries 256 different transparent character shapes on an opaque background. The characters are in coordinate-arranged groups CG of sixteen characters each, one group on each of sixteen coordinately-arranged group areas on the matrix CM.

A single cathode ray tube 61 is controlled to scan a raster equal in size to one sixteenth of its face and is indexed under type-setter tape control to apply the raster to any one of sixteen coordinately-arranged areas on its face. The flying light source impinges on an array of 16 lenses, which is preferably axially in line with the tube 61, or can be in an optical path from the cathode ray tube via a system of mirrors. The lenses are so constructed that whichever of the sixteen raster positions on the cathode ray tube is in use, light from the flying spot is transmitted by each lens to a corresponding one of sixteen coordinately-arranged character areas on each group area CG. A photomultiplier PM monitors each group area CG, and will respond to the flying spot tracing on a selected character in its group area CG. It will be seen that a character in each group area is scanned, but a single one of the sixteen photomultipliers PM is selected for operation under control of the type-setter tape, and selects that scanned character which is indicated by the instructions on the tape. Thus, the first four binary digits of an eight-digit binary number on the tape, which number identifies a character to be selected, will control raster-position selection, while the last four digits will control selection of a photo-multiplier.

Figure 2:
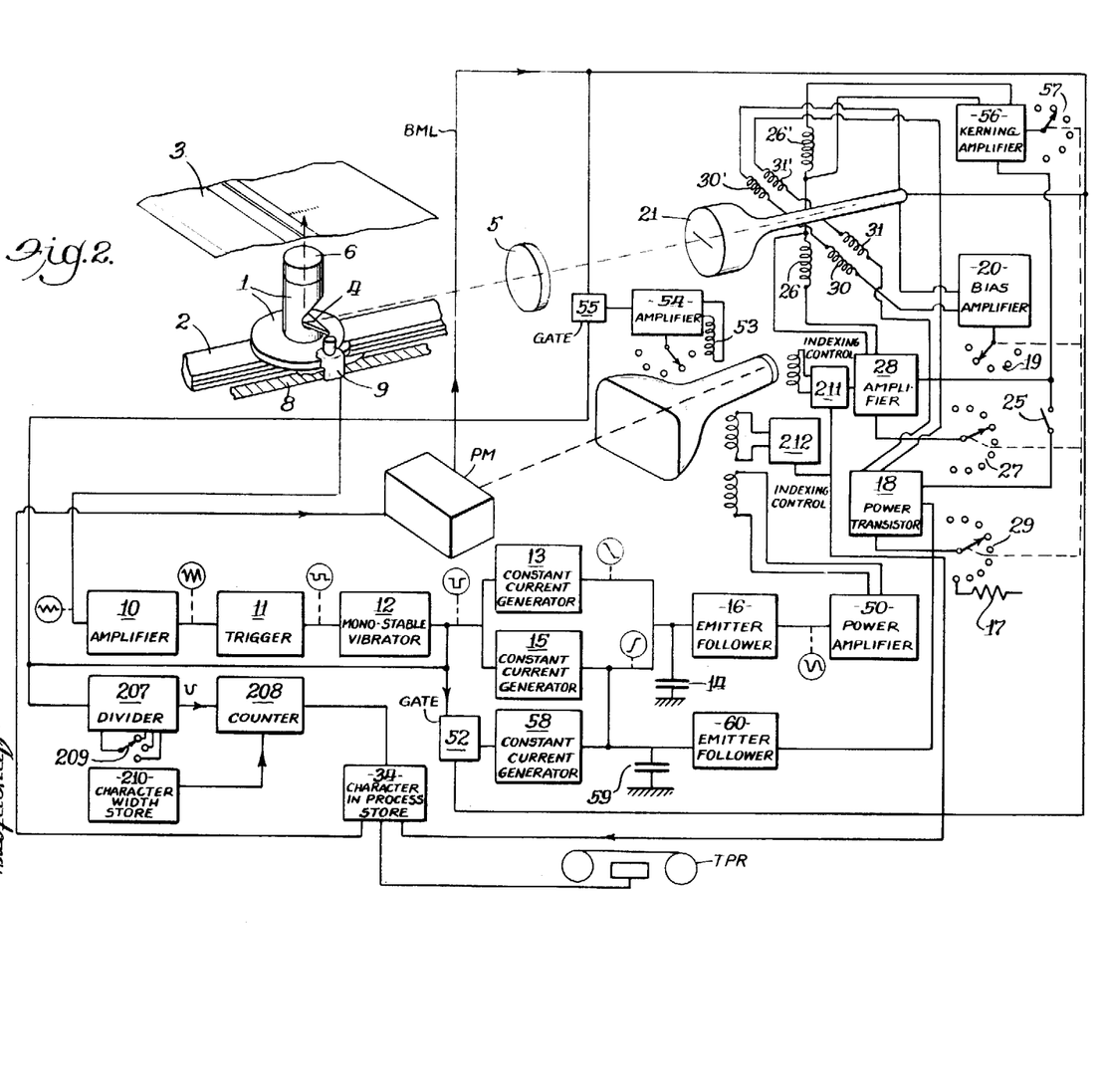
FIG. 2 shows, in schematic form, equipment comprising a cathode ray tube which responds to such modulated signal trains to produce a modulated flying spot of light which is applied line by line via optical scanning equipment onto photographic film to record a series of selected characters in page layout.

The recording equipment, FIG. 2, comprises a cathode ray tube 21, on the screen of which a flying spot traces invariable horizontal lines in synchronism with the vertical raster lines on the screen of the index CRT 61. The brightness of the light spot on the screen of tube 21 is controlled by the output signals from one of the 16 photomultipliers PM, FIG. 1, and is thus modulated according to the form of the particular character which is being scanned.

Figure 6:
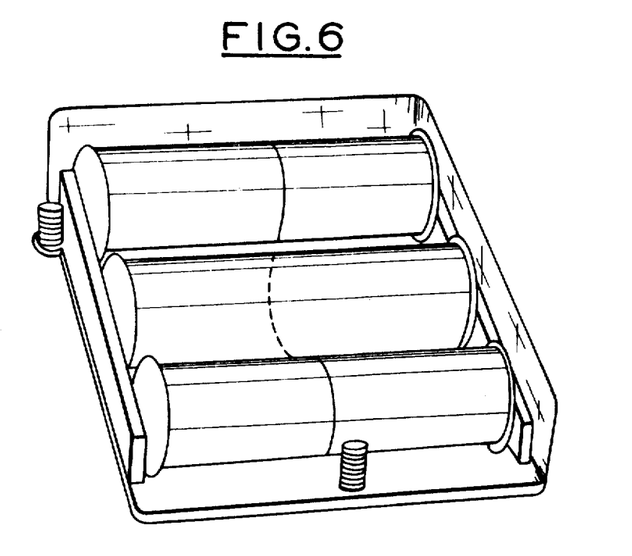
FIG. 6 is an isometric view of the photographic film carrier.

The controls on the tube 21 will be explained later. Axially in line with tube 21 is a collimator lens 5 leading to the camera proper 1–9. The camera comprises transport equipment shown in FIG. 6 for moving a length of photographic film 3 step by step at right angles to the reciprocatory path of the carriage 1 carrying the light beam transmission system of the camera. The reciprocatory carriage 1 carries an inclined mirror 4 for reflecting the horizontal light beam from the lens 5 at right angles through the lens system 6 on to the film 3.

By the means described below, the movement of the carriage 1 at high speed generates an electrical pulse cycle which controls the horizontal coils 26 of the tube 21 so that the beam traces out a line in synchronism with the movement of the carriage 1. The trace on the screen of tube 21 is brightness-modulated from a photomultiplier PM via the lead BML, and is directed onto a corresponding line across film 3 and is recorded thereon.

The movement of carriage 1 along its guides 2 generates an electrical pulse train by means of a light transmission grating system to be described in detail later but generally comprising a fixed grating 8 on the camera bed, a cooperating grating 7 carried by the carriage 1 and photo-electric pulse generating equipment 9 on the carriage. The pulses from the photo-electric equipment 9 pass via an amplifier 10, and a Schmitt trigger circuit 11 which squares up the pulses, to a monostable multivibrator 12. The amplifier 10 is A.C. coupled so that variations in the output level from the photo-cell equipment 9 have only a minor effect on the output of the amplifier/trigger circuit combination 10, 11.

The positive-going edges from the trigger circuit 11 drive the mutlivibrator 12, so that any variations in markspace ratio have negligible effect on the relation of the time-base to the position of the carriage 1.

The pulse from the monostable multivibrator turns on a constant current generator 13 which charges a capacitor 14 linearly, until a preset voltage is reached, at which the capacitor is clamped. The rate of charging and the clamping level are arranged so that the linear charging time of the capacitor is slightly less than the duration of the pulse from the monostable multivibrator. When the output returns to its normal rest position, the constant current generator 13 is turned off, and another constant current generator 15 is turned on. This second generator passes current of the opposite polarity into the capacitor thus discharging it, again in a linear manner. The discharge continues until the voltage on the capacitor reaches a second preset limit, where it is again clamped. The discharge time of the capacitor is arranged to be the same as the charging time.

Thus when fed with a succession of pulses from the moire fringe system 7, 8, 9, the time base generator 10–15 produces a succession of positive and negative going linear ramps, with brief pauses in between each, one ramp for each grating line.

The voltage on the capacitor 14 is fed through a succession of emitter followers, of which only one, 16, is shown, to provide a high impedance to low impedance transformation.

The output of the emitter follower 16 drives the bases of power amplifier 50 including transistors having in their collector circuits deflection coils 51 attached to CRT scanning tube 6, and having fixed resistors in their emitter circuits.

The output of monostable multivibrator 12 is similarly taken through a gate 52, activated as explained below, to a similar constant current generator 58. The rate of charging of a second capacitor 59 is linear and is stopped at the same instant as the clamping of capacitor 14. The emitter follower 60 uses a silicon transistor to provide a high enough output impedance to prevent drift of the voltage level on capacitor 59, over a period of time comparable to one sweep period.

Figure 8:
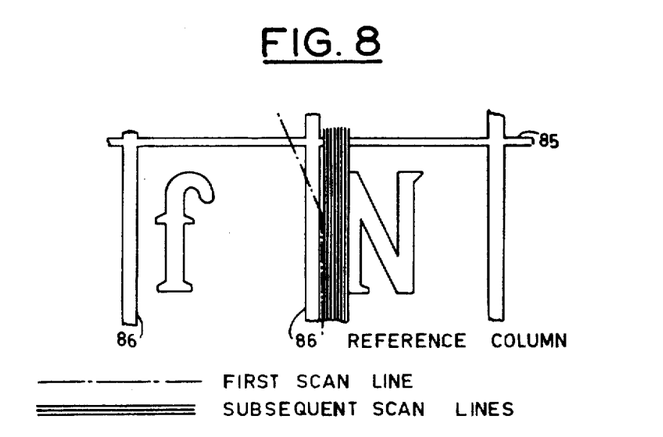
FIGS. 8 and 9 show the character scanning raster and line spacing means.

The sweep of index CRT 61 is caused to start by monostable multivibrator 12. To provide the highest degree of positioning accuracy, a horizontal reference bar 85, FIG. 8, is positioned above each character for the creation of a starting position for the print-out sweep. It is arranged that the first sweep on each character read starts above this reference bar, in the vertical direction. At such time as the beam completes the crossing of the reference bar on the matrix plate CM, the photomultiplier selected gives a positive going signal to activate the gate 52. Starting from an independently clamped level, the negative going linear voltage sweep on capacitor 59 causes the print-out tube 21 to trace a spot starting from a position corresponding to the lower edge of the reference bar above the character being scanned. The brightness modulation on tube 21, representing this reference bar, would fall all on one spot of the phosphor and may conveniently be suppressed.

The return positive-going voltage sweep on capacitor 59 is always started at the same instant as the return sweep on capacitor 14, and the spot on print-out tube 21 will return to its original clamp position. For a short period thereafter, the voltage on capacitor 14 controlling the sweep on index tube 61 will continue positive-going to regain its clamped level above the reference bar.

The suppression of brightness modulation is to be active only when the spot on tube 21 is stationary. The clamping action at both ends of the scan on index tube 61 may similarly be linked to a backing-out gate to eliminate phosphor overload or burn.

The output of the emitter-followers 60 drives the bases of power transistors 18 which have switched resistors 17 in their emitter circuits and the deflection coils 31 and 31' of the cathode ray tube 21 in their collector circuits. Circuits so arranged give a collector current which is very close to the base input voltage divided by the emitter resistance, provided that the back E.M.F. of the collector load is less than the available collector supply voltage.

The current output from the power transistors 18 therefore consists of positive- and negative-going linear ramps, the amplitude of which is determined by the value of emitter resistors 17 switched into the circuit. The emitter resistors are arranged so that suitable amplitudes of sweep on the cathode ray tube can be selected as required for the height of the characters being reproduced. The raster lines on the print-out tube 21 are horizontally related to the verticals of the scanned characters, so that the length of the raster line varies with the point size.

If reproduction of type characters between six and twelve point (approximately one twelfth to one sixth of an inch) is desired, it is an advantage to use a tube 21 giving a range of raster line length which are multiples of the point sizes, and to introduce a reduction factor in the optical system so that the line printed on the film 3 has the correct point size. The reduction is an image reduction whereby the line width as well as length is reduced so that the line width on the CRT need not be finely adjusted and so that any blemish on a tube face may be insignificant. In practice, a reduction of 12:1 is found to be satisfactory, and thus a 1 to 2 inch raster line length on the tube 21 is required and a raster line width 0.012 inch or less will be adequate. Some latitude is available through the capacity of lith-type film to fill in very closely spaced image lines and also to fail to respond to any fringing of the scan line which does not pass the film's threshold level.

In reproducing kerning or overhanging type, such as certain italic styles, a means must be provided to allow the top right-hand corner of one character to overhang the bottom left-hand corner of a following character. As shown, this is achieved by feeding a small proportion of the current in the main sweep coils 31 and 31' appropriate to the inclination of the adjacent images, via a switch 25 and amplifier 28 into a second set of sweep coils 26 at right angles to coils 31 and 31'. The amplitude of this current must vary in step with the main sweep, and current determining resistors for the italic sweep current amplifier 28 are connected to switch 27 and are selectively switched at the same time as the resistors 17 for the main current amplifiers 18 by means of the ganged switches 27, 29.

The sweep current is in one direction only, so that the spot on the face of the cathode ray tube 21 will be deflected from the center to one side unless a bias is introduced into the deflection. A continuous bias current is fed into a set of coils 30 and 30' in parallel with the main sweep coils 31 and 31', the magnetic field from coils 30 and 30' being of the opposite polarity to that induced by the current in the main sweep coils 31 ant 31'. Thus the whole width of the tube face can be utilised. The amount of this bias current is varied in proportion to the amplitude of the main sweep current, by means of a third ganged switch 19 which selects appropriate resistors connected to its contacts to control a bias current amplifier 20.

A fourth ganged switch 57, active only while kerning, controls the bias current in coils 26 and 26' opposing the kerning sweep current, by means of power amplifier 56, to ensure that characters being kerned are not bodily shifted to the left.

This type of time base has the advantage over more normal one-way scan systems in that a fast flyback is not required. This eases the problem of driving the inductance of the scanning coils by transistors, with their limited collector voltage. The system has the disadvantage that the scans overlap at the ends, instead of being parallel as in the normal one-way scan system, but where this produces any visible effect on the reduced image, a small current corresponding to the differentiated output of the monostable multivibrator 12 can be fed to a set of coils in parallel with those used for the italic sweep.

The time base generated under control of the gratings is used to control the scanned raster of the Index tube 61 so that the index tube and the print-out tube are both locked to the carriage movement. The horizontal indexing of characters on tube 61 can be controlled by similar circuits to those required for the vertical scan. The initial indexing of tube 61 for a new character starts to the left of a vertical reference bar 86, FIG. 8, and the print-out tube 21 is blacked out while a fast horizontal sweep is applied to the index tube by amplifier 54 in step with the vertical sweep from amplifier 50. At such time as this diagonal scan completes a crossing of a vertical reference column 86 (to the left of every character), the fast horizontal sweep is discontinued by gate 55 and the voltage corresponding to the position reached across the tube is, stored on a capacitor. This horizontal shift, or position, of the raster on the face of the index tube can be stored for a time equal to the time spent on the widest character envisaged, by the use of the same technique as that employed in emitter follower 60 described above. Subsequent to the first line, all vertical scan lines which cross elements of the character image in matrix plate 3 cause brightness modulation on print-out tube 21. A situation is shown on FIG. 8 where the first diagonal line of the scan of a new character can first cross a horizontal reference bar 85 above a preceding character and then cross the reference column 86 of the character to be scanned. To discriminate vertical reference bars from horizontal, the column 86 may be made twice the thickness of bar 85 and the gate 55 is arranged to be insensitive to short duration signals generated by crossing bar 85.

The output of the monostable multivibrator 12, FIG. 2, is available for feeding to a counter 208 via a divider 207, if it is desired to count grating lines as a positioning means. (In order to feed a count of one to the divider for each line of the raster both the front and back edges of each pulse from the multivibrator may be differentiated and counted.)

The function of the divider 207 is to give one output pulse for every N input pulses, when the Divisor N may be selected on a switch 209 manually or otherwise. By a suitable choice of grating pitch, for example 1300 lines per inch, the divisor N becomes the printers point size. In this case the output of the divider will be exactly one pulse for one eighteenth part of one em in any point size. The compatibility of this invention with other typesetting equipment can thereby be increased.

In reading out characters from a tape-reader TPR, each character code is stored in "character in process" store turn in 34, and is applied to character width store 210 which records the width in ems in the counter 208.

The grating pulses from the photoelectric grating equipment 7, 8, 9 applied to divider 207 result from the movement of the camera carriage 1 across the film 3, and a number of such pulses correspond to a character width. When the pulses outgoing from divider 207 have counted out the width number recorded in 208, a signal is sent to "character in process" store 34 calling for the next character.

The smaller the point size, the smaller the divisor determined by switch 209, so that the width number in 208 is counted out at a quicker rate.

The "character-in-process" store 34 also controls the selection of the photomultiplier activated in group PM, and also controls the X and Y raster indexing controls 211, 212, by means of which the beam of tube 61 is directed to the desired one of the sixteen raster locations on the face of the tube 61.

The print-out tube 21 is producing a succession of modulated linear traces which are laid side by side on the film 3. The character matrix contains only one upper-case and one lower-case representation of each letter, so that the machine must modify this single representation according to point size, which involves a like variation in both the height and width of a letter. As far as tube 21 is concerned, variations in height of a character involve variations in length of the individual linear traces, but as regards character width, the same character must be built up, for example, by half the number of linear traces for a 6-point character as are required for the corresponding 12-point character. Thus tube 61 must scan a character width with a varying number of vertical lines according to the point size. This demands variation of the horizontal sweep steps controlled by amplifier 54.

Figure 9:
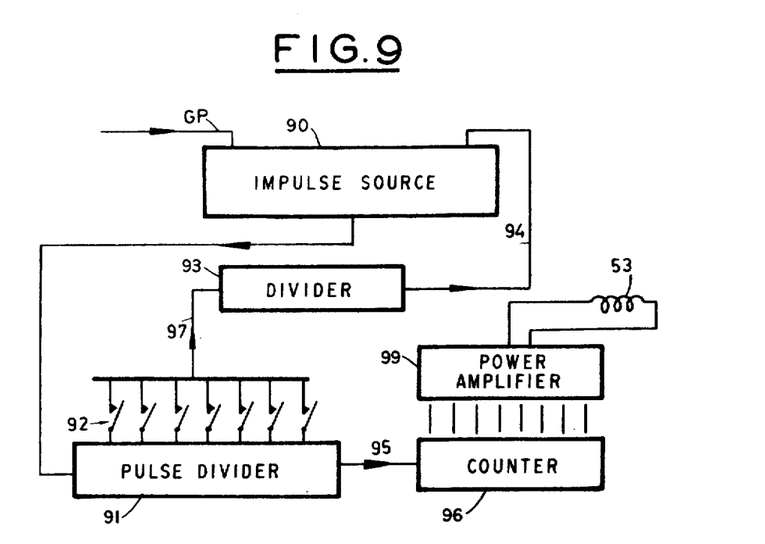

A control circuit to be associated with amplifier 54 for this purpose is shown in FIG. 9.

IN FIG. 9, grating pulses GP are applied to a source of fast impulses 90, giving pulses at, for example, 1,000,000 per second, as compared with grating pulses at a rate around 10,000 pulses per second. Each grating pulse GP initiates a burst of fast pulses to a multi-stage binary divider 91, successive stages of which give individual outputs at rate ½, ¼, . . . of the incoming pulse rate.

The individual stage outputs have individual switches 92 which, via a divider 93 produce a stop input pulse on conductor 94 connected to the Source 90, so that a pulse via 93, 94 will terminate the burst of pulses from which it was derived. The Divider 91 also has on output 95 from the last stage to a positioned number counter 96. No two outputs from the various stages of the divider 91 during a complete cycle of the divider coincide in time, so that when two or more switches 92 are closed in accordance with a desired point size, the number of pulses reaching lead 97 is the sum of the pulses passing the closed switches. Of course, these pulses are not equally spaced in time.

The relation between the pulse rates, and the division ratios is so chosen that even for the largest point size, there will be a number of pulses (at least three) to counter 96 for each grating pulse.

Where $f$ is the fast pulse frequency, the outputs via the successive switches 92 from the left and their point size allocations can be: $\frac{1}{2}f$ (8 pt.); $\frac{1}{4}f$ (4 pt.); $\frac{1}{8}f$ (2 pt); $\frac{1}{16}f$ (1 pt.); .... Thus for 6(4=2) point, the pulse rate on lead 97 is $(\frac{1}{4}+\frac{1}{8})f=\frac{3}{8}f$; for 12(8+4) point, the pulse rate on lead 97 is $(\frac{1}{2}+\frac{1}{4})f=\frac{3}{4}f$: and so on. The divider 93 will give a single stop output to source 90 for a given number, for example 16, of pulses received, thus ensuring an adequate minimum size of burst.

The positional number counter 96 controls a power amplifier 99 which applies current at a level which increases with the value of the number in counter 96, and controls the horizontal index deflection coils 53 via a horizontal amplifier 54 to space the vertical traces in accordance with the point size.

The maximum number in counter 96 for a character width can be, for example, 2048, but the total number recorded in counter 96 for a small point size for a narrow character may be as low as 400.

At the end of each character "print-out," the positional number counter 96 is re-set.

Alternatively, a basic stepped waveform may be amplified by a factor controlled by point size, in an analogue fashion.

In order to feed a count of "1" to the divider for each line of the raster, both the front and back edges of each pulse from the multivibrator may be differentiated and counted.

It is now possible to consider the timing relationships and controls of the whole system. Such a system is usually controlled by a TTS tape on which line-by-line print-out information is recorded in a more or less sophisticated manner. It is required to photograph across the film 3, with suitable spacings, the actual sequence of characters for each line of a page which is recorded in coded form on the TTS tape.

Thus, during one movement of the carriage 1 in FIG. 2 across the film 3, a number of suitably spaced characters are recorded, each character consisting of a number of closely-spaced vertical lines each of which results from a single sweep of the light spot in print-out tube 21, the beam from which moves parallel to itself across the mirrow 4 on the carriage 1 so that the vertically reflected beam sweeps a modulated spot of light longitudinally of the film 3 to create one of the individual parallel lines which are shown schematically on the film 3 and which build up the succession of characters in a row across the film 3 during one unidirectional movement of the carriage 1 along its guides.

Assume that the coded information for the next line of type is being read from the tape, and the code corresponding to the first character is available in the "character-in-process" store 34.

The code for the first character to be printed is utilised to select the photomultiplier PM concerned with the wanted character and to direct the beam of the index tube to the correct one of the sixteen raster positions for the character.

The width of the first character is also translated into a grating pulse count by the equipment 207–210.

At the termination of each character count, the next selected character is scanned with a line-spacing determined by the equipment shown in FIG. 9, and is printed out while the counter counts the requisite number of pulses.

The counting of space and character widths continues as the carriage proceeds, and the row of characters is built up.

Referring now to FIGS. 3–7, the electro-optical printout system 1–9; 21–23, FIG. 2, is mounted on the base 32, which also carries the power pack 33 for the electrical equipment. The tube 21, the periscope 22, and the optical system 1–6, are arranged in parallel, substantially coterminous, channels on the base 32, the periscope turning the light beam from the tube 21 through four successive right-angles on to the collimating lens 5 which scans the laterally-moving beam across the face of mirror 4, which in turn directs each beam scan vertically via the lens system 6 in a longitudinal line on to the film 3, FIG. 2.

The periscope path equals the focal length of the collimator.

Figure 3:
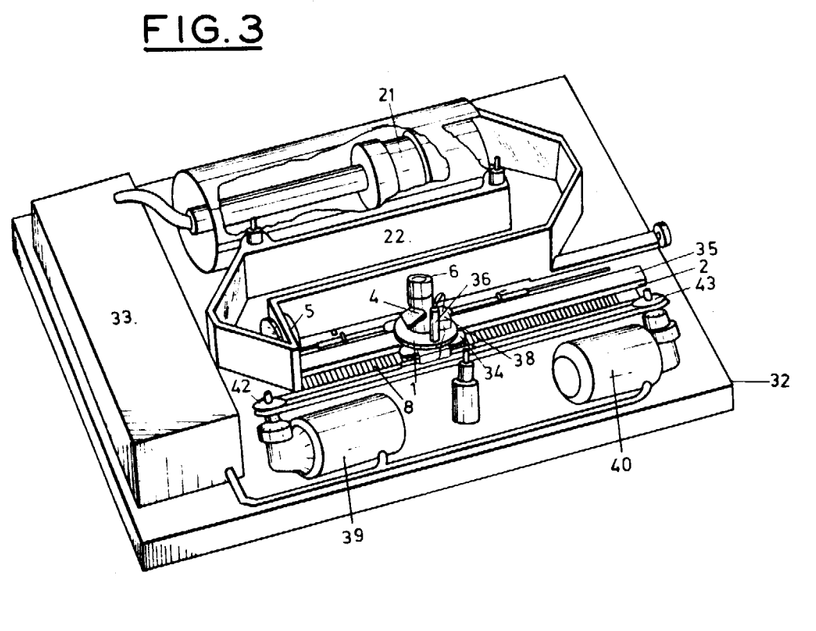
FIG. 3 shows scanning pulse generating equipment which forms part of the modulated light beam distributing system of FIG. 2 and which is used as a self-clocking control for the index tube of FIG. 1 and for the cathode ray tube of FIG. 2.
Figure 4:
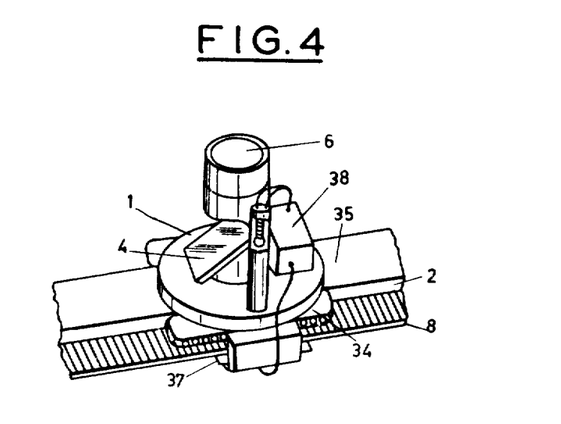
FIGS. 4 and 5 are isometric and side elevation views of the scanning carriage 1 of FIG. 3.
Figure 5:
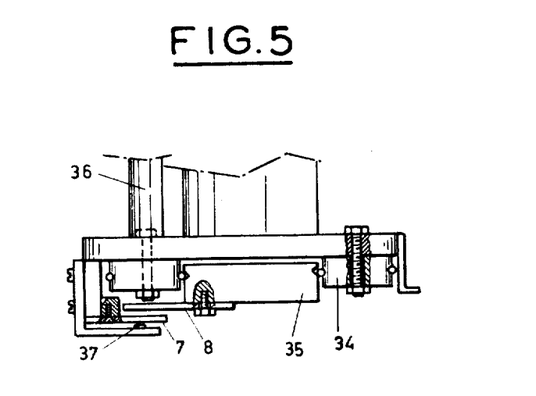

The moving carriage 1 is mounted on a rigid ball-bearing slide 34 locked to precision-ground concave tracks 2 on each side of a flat steel bar 35 which is adjusted to be parallel with the film 3, and which directly supports the glass transmission grating 8. The carriage 1 carries the mirror 4 which reflects the output of the collimating lens 5 through the image forming projection lens 6 to the film 3.

Alternatively, the tube 21 and the mirror 3 can be axially in line as indicated in FIG. 2, without an intervening optical system, or with only a collimating lens therebetween. The mirror 4 can also be arranged to direct the beam in a horizontal plane.

The carriage also carries a short index grating 7, a light source 36, a photo-electric pick-up 37, and a transistor preamplifier 38 (FIGURES 3 and 5). The light source 36 is arranged at a sufficient distance relative to the emulsion-to-emulsion separation of the two gratings (i.e. 4 inches to .002 inch) so that the divergence of the light passing through the gratings has a minimal effect.

The photo-electric pick-up 37, which may be a silicon photocell, and preamplifier 38 which amplifies the output of pick-up 37 form part of the photo-electric pulse generating equipment 9, FIG. 2, so that referring to FIG. 2, the amplified pulse train for preamplifier 38 is fed to the time base generators 10–12, and give sufficient variation in output for accurate pulse generation. The light source 36 and photo-cell pick-up 37 are also attached to the carriage above and below the gratings so that the light passes through the index gratings 7 and the fixed grating 8 and causes a moire fringe pattern to pass across the face of the photo-cell.

The angle of the index grating lines relative to the fixed grating lines being small and constant, the effect (as is well known) is that a complete fringe pattern, .125 inch or more in width, passes across the sensitive area of the photo-cell for each fixed grating line traversed.

Thus the peaks of the modulation of the photo-cell output correspond to the intervals of the grating, and they are amplified and shaped to give square pulses, which after further amplifying and shaping are used to deflect the spot on the cathode ray tube. It may be noted that the time period of the raster image produced on the film is controlled completely by the grating on the track, in a particular case one forward line or one backward line of the raster being produced for every line of the grating.

The movement of the carriage 1 is effected by two motors 39, 40, FIG. 3, connected by clutches to an inelastic belt fixed to the carriage 1 and passing around pulleys 42, 43 driven respectively by motors 39, 40. The motors are clutched in alternately, one driving in a forward direction during modulation of the raster and character imaging, the other returning the carriage in preparation for the succeeding line. The return stroke may be at a higher speed than the forward movement, and during the return, the film 3 is advanced by a suitable interval ready to accept the next line.

Alternatively, a single motor, can be geared to the two pulleys 42, 43 via clutches, so as to switch the drive from one to the other and to drive the pulleys at different speeds in the ratio of, for example 1:3.

Figure 7:
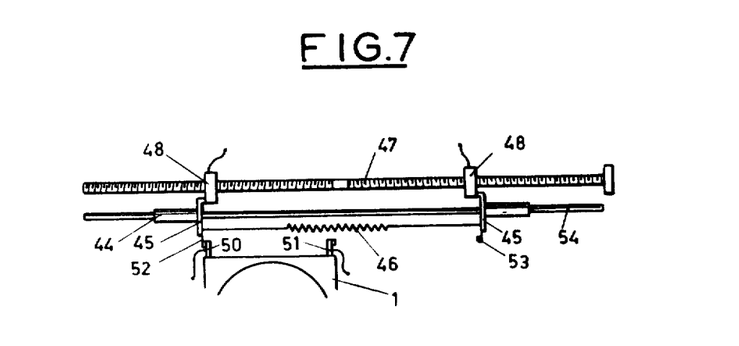

Drive reversal for the carriage 1 in order that it shall reciprocate with a substantially constant stroke in each direction is controlled in the manner shown in FIG. 7. Sleeves 44 are slidably mounted on a guide rod 54 and carry facing collars 45 joined by a tensile connection 46 tending to draw the collars 45 together. A threaded rod 47 carries adjustable nuts 48 spaced so as to fit between collars 45 and locate them. The carriage 1 is reciprocated below and parallel to the guide rod 54, and contact terminals 50, 51, are mounted at each end of carriage 1. Contacts 52, 53 are carried by the collars 45 and are located in the paths of movement of contacts 50, 51.

In the position shown in FIG. 7, carriage 1 has reached the extreme position in moving to the left so that contacts 52, 50 are closed and complete a circuit via 50, 52, 45, 48.

The closure of contacts 52, 50 changes over the operating circuit from motor 39, FIG. 3, to motor 40, which now starts to drive the carriage to the right. The carriage continues to move until contact 53 contacts contact 51, when the motor control circuit is again reversed, opening the circuit of motor 40 and closing the circuit of motor 39. The spring connection between collars 45 allows a certain overrun of the belt, without loss of control of the movements.

Alternatively, and preferably, photo-electric means is provided at each end of the carriage run for detecting the arrival of an aperture (or mask).

At the starting end for the print-out stroke, the carriage is always reversed by the photo-electric means. At the other end, reversal is controlled by electrical means operated at the end of each line print-out, or the like, the photo-electric detector operating as a safety device.

In the case described, raster lines may be produced at a thousand per inch on the film. If the carriage is driven at a speed of ten inches per second, the frequency of the associated circuitry is required to be 10 kc. A phosphor decay time of 1 microsecond, which is now available, is then appropriate for the cathode ray tube, and is compatible with a high speed lith-type emulsion: that is, the decay of the screen image is sufficiently rapid to eliminate visible image blur, particularly when acting upon the extreme contrast emulsion normally used to produce dense high definition images for graphic arts applications.

The character matrices for different type-founts have different widths, although these widths do not vary with point sizes within the same fount.

Because of this, there is a character width store 210 for each type-fount, and the character width store is changed when the character matrix is changed to a different fount.

However, for the same fount, only one representation is given on the matrix for each character, and the point-size must be developed in the raster scanning of the character by the index tube 61.

Thus there are two controls on the sweep coils 53. The width counter counts out the time period allowed for a character to be scanned and the point-size control controls the spacing of the fixed number of vertical lines, so as to create variations in the width of the printed character.

The philosophy of the system is to print-out, as it were blindly, a number of linear traces generated, in an invariable linear position on the print-out tube, side by side with an invariable spacing, up to a maximum number constituting a line. The print-out equipment is not concerned with the grouping of the linear traces into characters and words. While the spacing of words could be achieved by blocking out the print-out tube for a suitable time, it is simpler to treat a space as a character, and the matrices will include "space" characters, the scanning of which will provide a like number of blank linear traces on the print-out tube.

For each type fount, each "character" will have a single representation, the point size and width of which is taken into account electrically in the over-all sequence of operations constituting the selection and scanning in turn of the "characters," resulting in the sequence of linear traces which control the print-out of a line.

The points of application of the various controls in order to obtain the print-out flexibility required can be varied without departing from the principles of the present invention.

It is possible to move the position of the linear trace on the print-out tube and the effect of continuous very slow movement of the trace position parallel to itself, would result in slightly expanding or slightly contracting the parallel array of picture lines built up on the film.

Such a movement could be provided for in the design of the machine.

The reason for such a movement would be to prevent burning of the screen, due to constant use of the same linear position thereon, but it is believed that no such risk exists.

It will be understood from the foregoing, that the angle of the linear trace is not always the same: for instance, when printing italic characters. However, changes of angle are only likely to occur at natural breaks in the copy, so that a succession of parallel linear traces is likely to be generated at each such angle.

Many ways of generating the linear traces and directing them on to a sensitive surface in side-by-side parallel relation can be conceived, and all such ways are within the scope of the present invention.

What we claim is:

1. Photographic reproduction equipment for use with a photo-sensitive sheet, said equipment comprising:
   a scanning cathode ray tube for scanning a succession of rectangular subjects to be reproduced raster fashion;
   a print-out cathode ray tube to be used as a photographic source of light;
   a carriage reciprocable along a linear path parallel to the axis of the print-out tube;
   a support for said photo-sensitive sheet adapted to present successive parallel lines on a supported sheet in a fixed printing position parallel to and spaced from the carriage path;
   an optical system carried by said carriage adapted to be moved parallel to the axis of the print-out tube and arranged so as to direct a beam from the print-out tube through a right angle on to said printing position on a supported photo-sensitive sheet;
   an electro-optical grating system mounted partly on said carriage and partly on its runway for generating electrical pulses during movement of said carriage;
   a matrix of rectangular subjects, including a space subject;
   program means for controlling said scanning cathode ray tube to scan a succession of subjects on the matrix in turn;
   raster control means for said scanning cathode ray tube controlled by electrical pulses generated by said electro-optical grating system whereby each vertical trace of said scanning cathode ray tube is initiated by a pulse of said pulse train;
   print-out control means for applying successive trace signals generated by said scanning cathode ray tube during the scanning in succession of a series of subjects, said successive trace signals being generated on the face of the print-out cathode ray tube under control of said electrical pulses generated by said electro-optical grating system, so that a succession of traces generated by said print-out tube and corresponding to a number of scanned subjects are applied by said optical system on said carriage side by side in parallel relation along a linear printing position on a stationary photo-sensitive sheet on said support; and means for moving successive spaced line positions on a sheet on said photo-sensitive sheet support to said printing position.

2. Equipment as claimed in claim 1 wherein said signal generating means is arranged to generate a signal train during movement of the carriage in one direction at a first speed during which a linear trace is formed on the print-out screen and directed on to the photo-sensitive sheet, said carriage being returned in the opposite direction at a higher speed while CRT flyback takes place and said sheet is moved.

3. Equipment as claimed in claim 1 wherein a short grating is carried by the carriage in closely-spaced relation to the fixed grating which is fixed to the carriage support and is at least as long as the carriage movement, and wherein the carriage carries a light source and a photo-electric device positioned on opposite sides of the gratings with the light source spaced from the gratings by a distance such that divergence of light through the gratings will not prejudice raster control.

4. Equipment as claimed in claim 3 wherein the distance of the light source from the adjacent grating is of the order of a thousand times greater than the spacing of the gratings.

5. Equipment as claimed in claim 1 comprising a counting device for counting successive groups of grating pulses, control means for controlling the individual sizes of successive pulse groups according to the widths of the characters to be reproduced, and means for signalling to a character-sequence control device that the identity of the next character to be reproduced is required.

6. Equipment as claimed in claim 5 and comprising a group-size adjustment device for applying any one of a range of size factors to the individual group sizes, variations in the setting of said adjustment device applying the corresponding factors to all groups counted while the settings persist.

7. Equipment as claimed in claim 1 and comprising binary arithmetic circuits to which the grating pulses are applied and which are controlled by point size information to determine raster line spacing.

8. Equipment as claimed in claim 1 wherein the masters are scanned by a flying spot light source on the face of a first cathode ray tube, converted into electrical brightness signals by photo-electric cells, and displayed line by line for photographic recording on the face of a second, and comprising means for varying the magnification from said matrix to the recorded reproduction by controlled rate horizontal sweeps upon said scanning tube and controlled rate vertical sweeps on said print-out tube.

9. Equipment as claimed in claim 1 and comprising circuits arranged to detect control bars on said matrix which define raster areas for respective subjects and which have the same optical characteristics as the subjects and to control the beam of the print-out tube, whereby the print-out tube will be blacked out until the trailing edge of such a bar is detected.

10. Equipment as claimed in claim 9 wherein said circuits are arranged to apply both a horizontal sweep and a vertical sweep to the scanning tube at the beginning of raster propagation, whereby the flying spot will pass across a vertical bar at the side of the subject to be scanned, and are arranged to respond to the trailing edge of a bar when a predetermined width of bar has been detected and in response thereto to discontinue the horizontal sweep and to brighten the beam of the print-out tube.

11. Equipment as claimed in claim 1 and comprising control means for applying to the print-out tube a vertical sweep proportional to the horizontal sweep producing the linear trace for producing kerning or overhanging characters.

12. Equipment as claimed in claim 11 and comprising control means for the vertical bias coil of the print-out tube to prevent bodily shift of kerned characters.

13. Equipment as claimed in claim 11 and comprising means ganged to the point size adjusting means for adjusting the kerning.

14. Equipment as claimed in claim 1 and comprising means for supplying a continuous bias to the print-out tube to position the starting point of the linear trace path to one side of the tube face whereby substantially the whole face of the tube can be used.

References Cited

UNITED STATES PATENTS

| | | | |
|---|---|---|---|
| 3,068,465 | 12/1962 | Covely et al. | |
| 3,106,880 | 10/1963 | Rossetto et al. | 95—4.5 |
| 3,218,945 | 11/1965 | O'Brien et al. | 95—4.5 |
| 3,255,683 | 6/1966 | Kerschbaum | 95—4.5 |
| 3,273,476 | 9/1966 | Haynes | 178—6.7 |
| 3,281,822 | 10/1966 | Evans | 340—324.1 |
| 3,324,346 | 6/1967 | Stone | 340—324.1 |
| 3,349,172 | 10/1967 | Mauchel | 340—324.1 |

JOHN W. CALDWELL, Primary Examiner

M. M. CURTIS, Assistant Examiner

U.S. Cl. X.R.

95—4.5; 178—6.7, 15

UNITED STATES PATENT OFFICE
CERTIFICATE OF CORRECTION

Patent No. 3,508,245                                                April 21, 1970

Haydn Victor Purdy et al.

It is certified that error appears in the above identified patent and that said Letters Patent are hereby corrected as shown below:

Column 1, line 41, "of" should read -- on --; line 59, "colcking" should read -- clocking --. Column 2, line 53, "coordinate" should read -- coordinately --; line 69, after "photomultiplier" insert -- tube --. Column 4, line 6, "6" should read -- 61 --; line 44, "backing" should read -- blacking --. Column 5, line 16, after "26" insert -- and 26′ --. Column 6, line 13, after "raster" insert a comma. Column 7, line 1, "positioned" should read -- positional --.

Signed and sealed this 29th day of September 1970.

(SEAL)

Attest:

Edward M. Fletcher, Jr.                          WILLIAM E. SCHUYLER, JR.
Attesting Officer                                        Commissioner of Patents